July 24, 1934.　　　　C. A. SCHACHT　　　1,967,785
SIPHON STRAINER OR THE LIKE
Filed Feb. 3, 1933
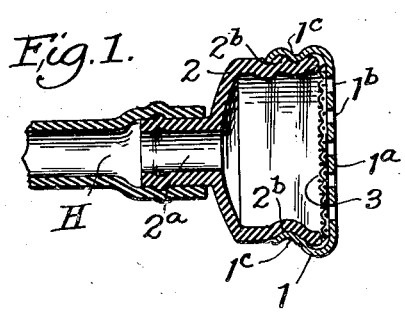
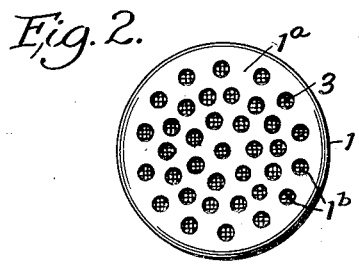
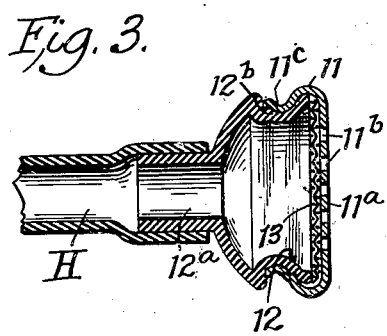
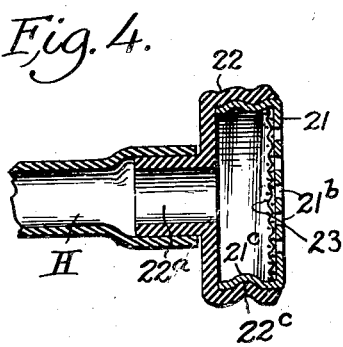
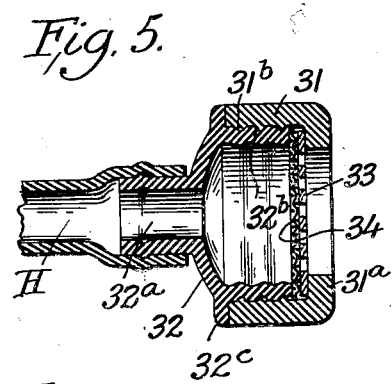
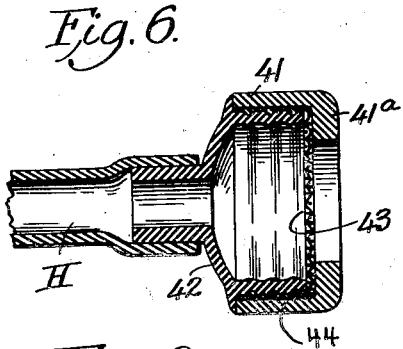
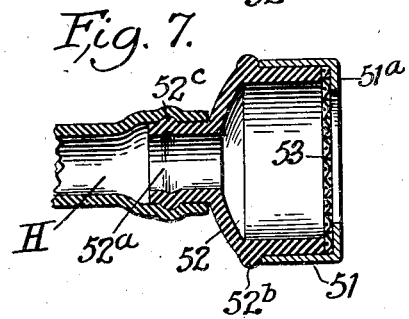
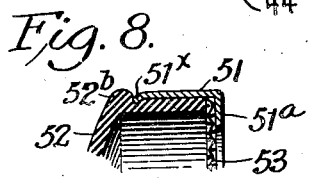

Patented July 24, 1934

1,967,785

UNITED STATES PATENT OFFICE 1,967,785

SIPHON STRAINER OR THE LIKE

Clifford A. Schacht, Huntington, Ind.

Application February 3, 1933, Serial No. 655,089

8 Claims. (Cl. 210—94)

This invention is a novel improvement in strainers particularly adapted to be used at the intake ends of siphon tubes or the like, to prevent any sediment from being carried over by the tubes from the receptacle to the container which is being filled.

The principal objects of the invention are to provide a siphon strainer consisting of a hollow body of pliable rubber, molded in one piece, having a contracted upper end adapted to be entered into the inlet end of a siphon tube; a metallic or molded rubber cup-shaped casing being interlocked with the body and forming or retaining a screening member and also maintaining the body in shape.

A further object of the invention is to provide the molded rubber body with an integral exterior flange covering the rough unfinished upper edge of the casing, thereby enhancing the appearance of the strainer.

Further objects of the invention are to provide a siphon strainer which, although made of soft and pliable rubber, will not warp out of shape and become worthless after short use; also to provide a strainer which is easy to manufacture, and will have the appearance of a one-piece strainer.

Other minor objects of the invention will be hereinafter set forth.

I will explain the invention with reference to the accompanying drawing which illustrates several practical embodiments thereof to enable others to adopt and use the same; and will summarize in the claims the novel features of construction, and novel combinations of parts, for which protection is desired.

In said drawing:

Fig. 1 is a longitudinal section through one form of strainer showing same applied to the end of a siphon tube.

Fig. 2 is a plan view of the strainer shown in Fig. 1.

Figs. 3 and 4 are longitudinal sections through modified forms of the strainer, provided with metallic cup-shaped casings forming or retaining the straining elements, the casings being mounted on or in the molded rubber body.

Figs. 5 and 6 are longitudinal sections through further modified forms in which the casings retaining the straining elements are made of molded rubber and mounted upon the molded rubber body.

Figs. 7 and 8 are longitudinal sections through still further modified forms in which the casings are made of metal.

As shown in Figs. 1 and 2, the siphon strainer is made of two parts. The outer metallic part 1 is substantially cup-shaped and closed at its outer end by a plate 1a, having a plurality of perforations 1b punched therein. The walls of the part 1 are preferably threaded or corrugated as at 1c for the purpose of increasing the friction between the walls of the casing 1 and those of the inner rubber body 2. Body 2 is of molded rubber, the same being hollow and open at both ends, and of such diameter as to make a tight fit within the walls of casing 1. At the upper end of body 2 is a contracted neck 2a adapted to fit within the inlet end of a siphon hose H. The reduced end 2d of rubber body 2 should be made slightly larger than the internal diameter of hose H so that when inserted therein the body will be firmly and frictionally engaged with the hose. By forming the body 1 of molded rubber, instead of metal, a very inexpensive article is provided as the contracted neck 2a is molded, whereas if made of metal the formation of the neck would involve a considerably more expensive operation. Between the perforated plate 1a of casing 1 and the end of the body 2 one or more wire screens 3 of fine mesh may be placed to assist the perforated plate 1a in filtering or straining the liquid passing into hose H. If desired the screens 3 may be omitted. The side walls of the rubber body 2 can be molded with plain sides, or the sides can be threaded or corrugated as shown at 2b to correspond with the threads or corrugations 1c of the casing 1 and frictionally maintain the body engaged with the casing.

In Fig. 3 a modified strainer is shown in which an exterior annular flange 12b is formed on the rubber body 12 adapted to cover the inner rough end of the metallic casing 11, thereby enhancing the appearance of the strainer. The parts are otherwise substantially the same as those of Fig. 1, the walls of the inner and outer casing being threaded or corrugated as shown at 11c, 12b; and the screen or screens 13 being positioned between the lower end of body 12 and the perforated end plate 11a of casing 11.

In Fig. 4 the strainer is substantially the same as that shown in Fig. 3, except that the rubber body 22 is made of larger diameter than the metallic casing 21. The rubber body is stretched over the metallic casing 21 and completely hides the latter. In this modification the walls of the rubber body 22 may be smooth, or may be threaded or corrugated as at 22c to engage the threads 21c on the metallic casing 21. The end plate of casing 21 is perforated as at 21b, and one or more screens 23 may be used, as desired, or the screens omitted.

In Fig. 5 a further modification is shown in which the outer casing 31 is made of molded rubber and has an internal annular flange 31a at its outer end against which the perforated strainer plate 33 seats. The body 32 is substantially the same as that shown in Fig. 3, but the body 32 is provided with an external annular flange 32c of width equal to the thickness of the walls of casing 31, the flange covering the end of the casing 31 and giving the strainer the appearance of a one-piece article. Flange 32c however may be omitted if desired. The parts 31, 32 could be cemented together, or could be made with interengaging threads or corrugations 31b—32b for locking the same together. If desired a wire screen 34 may be also used with the perforated plate 33.

In Fig. 6 a still further modified form of strainer is shown in which the perforated plate 33 (Fig. 5) is omitted, and a wire screen 43 is used instead. The outer casing 41 of molded rubber has the internal annular flange 41a at its outer end. The side walls of the casing 41 are smooth and the casing is cemented to the body 42 by cement 44. The molded rubber body 42 is substantially the same as that shown in Fig. 5. The rubber members may be made of rubber stock of different hardnesses.

In Fig. 7 the molded rubber body 52 is substantially the same as in Fig. 3, the body having an external annular bead 52b for covering the end of casing 51. The reduced neck 52a is provided with an external bead 52c intermediate its ends for preventing the hose H from being readily pulled off of the neck when assembled. The side walls of the body engaging the casing 51 are preferably smooth, but may be roughened or corrugated if desired. The casing 51 preferably has smooth side walls, and at the outer end of the casing is an annular internal flange 51a forming a seat or shoulder for retaining the screen or screens 53 against the end of the body 52. The metallic casing 51 is made slightly smaller in diameter than the diameter of the body 52, and when slipped over the end of the body the casing will be retained thereon by friction and by the resiliency of the rubber of the body 52; or the edge of the body 51 could be rolled in as at 51x (Fig. 8) to assist in holding the parts together; or the casing 52 could be glued or cemented onto the body 52.

In my strainers the body of molded rubber is inexpensively formed, and is molded with a reduced neck for insertion in the end of hose H. The necks of the rubber bodies may be made in different sizes to fit different sizes of hose H. The flange, projecting over the rim of the outer casing not only covers the sharp edge of the metal, but also enhances the appearance of the strainer. The sides of the body and casing may be made smooth, or may be threaded or corrugated to prevent the parts from becoming disengaged when in use, and the resiliency of the rubber will assist in holding the parts together.

I claim:—

1. A liquid strainer for siphon tubes and the like, comprising a hollow body of soft molded rubber open at both ends and having one end reduced to enter the end of the tube; a cylindrical casing engaging the other end of the body, and means associated with the casing for straining liquid entering the body, the resiliency of the rubber retaining the casing on the body.

2. In a strainer as set forth in claim 1, the casing enclosing the end of the body; and the body having an exterior annular flange covering the end of the casing.

3. In a strainer as set forth in claim 1, the casing having an internal annular shoulder; and said means comprising one or more screens supported upon the shoulder.

4. In a strainer as set forth in claim 1, said casing being of molded rubber enclosing the end of the body and having an internal annular shoulder; and said means comprising one or more screens interposed between the end of the body and the shoulder.

5. In a strainer as set forth in claim 1, the body having an external flange at its upper end; and said casing enclosing the end of the body and having an internal annular shoulder at its outer end; and said means comprising a screen interposed between the end of the body and the shoulder; and the flange on said body extending to the outer walls of the casing.

6. In a strainer as set forth in claim 1, the body having an external flange at its upper end; and said casing being of molded rubber adapted to fit over the end of the body and having an internal annular shoulder at its outer end; and said means comprising a screen interposed between the end of the body and the shoulder; and the flange on said body extending to the outer walls of the casing.

7. In a strainer as set forth in claim 1, the inner edge of the casing being rolled inwardly to assist in locking the casing on the body.

8. In a strainer as set forth in claim 1, the inner edge of the casing being rolled inwardly to assist in locking the casing on the body; and the body having an external flange covering the inwardly rolled edge of the casing.

CLIFFORD A. SCHACHT.